United States Patent
Liu

(10) Patent No.: US 10,297,285 B2
(45) Date of Patent: May 21, 2019

(54) VIDEO DATA PROCESSING METHOD AND ELECTRONIC APPARATUS

(71) Applicant: Lenovo (Beijing) Co., Ltd., Beijing (CN)

(72) Inventor: Wenqiang Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/941,143

(22) Filed: Mar. 30, 2018

(65) Prior Publication Data
US 2019/0103136 A1    Apr. 4, 2019

(30) Foreign Application Priority Data
Sep. 30, 2017   (CN) .......................... 2017 1 0920016

(51) Int. Cl.
| | | |
|---|---|---|
| H04N 5/92 | (2006.01) | |
| H04N 5/76 | (2006.01) | |
| G11B 27/036 | (2006.01) | |
| H04N 5/262 | (2006.01) | |
| H04N 5/77 | (2006.01) | |

(52) U.S. Cl.
CPC ......... *G11B 27/036* (2013.01); *H04N 5/2621* (2013.01); *H04N 5/77* (2013.01)

(58) Field of Classification Search
CPC ....... G11B 27/036; H04N 5/2621; H04N 5/77
USPC ................ 386/337, 341, 223, 224, 248, 353
See application file for complete search history.

(56) References Cited

U.S. PATENT DOCUMENTS

| | | | |
|---|---|---|---|
| 9,467,627 B2 * | 10/2016 | Laroia .................. | G02B 13/009 |
| 2002/0118293 A1 * | 8/2002 | Hori ......................... | G06T 5/50 |
| | | | 348/362 |
| 2010/0007665 A1 * | 1/2010 | Smith ..................... | G06T 13/40 |
| | | | 345/473 |

FOREIGN PATENT DOCUMENTS

WO    WO2013104142    * 7/2013

* cited by examiner

*Primary Examiner* — Robert Chevalier
(74) *Attorney, Agent, or Firm* — Anova Law Group, PLLC

(57) ABSTRACT

A video data processing method and an electronic apparatus are provided. The method includes obtaining a first image in a first video and separating a first part from the first image. The first video has a recording duration of a first time length. The method also includes obtaining a second image in a second video. The second video has a recording duration of a second time length. The first and second time lengths are different. Further, the method includes forming a composite image by compositing the first part of the first image and the second image, and forming a target video from a plurality of composite images, the plurality of composite images including the composite image.

20 Claims, 5 Drawing Sheets

VIDEO DATA PROCESSING METHOD AND ELECTRONIC APPARATUS

CROSS-REFERENCES TO RELATED APPLICATIONS

This application claims the priority of Chinese patent application No. 201710920016.8, filed on Sep. 30, 2017, the entirety of which is incorporated herein by reference.

FIELD OF THE DISCLOSURE

The present disclosure generally relates to the field of video processing technology and, more particularly, relates to a video data processing method and an electronic apparatus.

BACKGROUND

With the continuous development of photographing technologies, more and more requirements have been put on photographing images/videos. In film and television works or ordinary shooting scenes, the photographed and recorded video often desires to have an effect of inconsistent status-changing rate between a main part and a background part, thus presenting a special effect of the main part/the background part having status-changing effect of high-rate/low-rate status-changing. For example, a special effect of character travelling through time, or a special effect of character's fast motion/slow motion is able to be presented. However, current photographing and recording technologies cannot achieve such special effect.

Accordingly, there is a need to provide a video processing solution to meet the above requirements and to enable the processed video to present the effect of inconsistent status-changing rate between two different parts (e.g., the main part and the background part) in a same video. The disclosed processing method and electronic apparatus are directed to solve one or more problems set forth above and other problems in the art.

BRIEF SUMMARY OF THE DISCLOSURE

One aspect of the present disclosure includes a method, including obtaining a first image in a first video and separating a first part from the first image. A recording duration of the first video is a first time length. The method also includes obtaining a second image in a second video. A recording duration of the second video is a second time length, and the first and second time lengths are different. Further, the method includes forming a composite image by compositing the first part of the first image and the second image, and forming a target video from a plurality of composite images, the plurality of composite images including the composite image.

Another aspect of the present disclosure includes another method, including obtaining a first image in a first video and separating a first part from the first image. The first video is recorded at a first frame rate. The method also includes obtaining a second image in a second video. The second video is recorded at a second frame rate, and the first and second frame rates are different. Further, the method includes forming a composite image by compositing the first part of the first image and the second image, and forming a target video from a plurality of composite images, the plurality of composite images including the composite image.

Another aspect of the present disclosure includes an electronic apparatus. The apparatus includes a first device, a second device, and a compositor. The first device obtains a first image in a first video and separates a first part from the first image. The first video has a recording duration of a first time length or the first video is recorded at a first frame rate. The second device obtains a second image in a second video. The second video has a recording duration of a second time length or the second video is recorded at a second frame rate. The first and second time lengths are different, or the first and second frame rates are different. The compositor forms a composite image by compositing the first part of the first image and the second image, and forms a target video from a plurality of composite images, the plurality of composite images including the composite image.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to various embodiments of the disclosure, which are illustrated in the accompanying drawings. Wherever possible, the same reference numbers will be used throughout the drawings to refer to the same or the alike parts. The described embodiments are some embodiments but not all of the embodiments of the present disclosure are described herein. Based on some embodiments, persons of ordinary skill in the art may derive other embodiments consistent with the present disclosure, all of which are encompassed within the scope of the present disclosure.

Some embodiments in the present disclosure are merely examples for illustrating the general principles of the invention. Any equivalents or modifications thereof, without departing from the spirit and principle of the present disclosure, fall within the true scope of the present disclosure.

Moreover, in the present disclosure, the terms "include" and "contain" and their derivatives mean inclusion but not limitation. The term "or" is inclusive and means "and/or". The term "and/or" may be used to indicate that two associated objects may have three types of relations. For example, "A and/or B" may represent three situations: A exists, A and B coexist, and B exists.

As used herein, the term "field-depth" refers to a distance or a distance range between a nearest point (before a focal point) and a farthest point (after the focal point) after a camera lens or other imager has been focalized for forming a sharp image.

The present disclosure provides a video data processing method and an electronic apparatus. The present disclosure enables the processed video to present an effect of inconsistent status-changing rate between two different parts. The disclosed method can be applied to an electronic apparatus. The electronic apparatus may be a terminal device, such as a smart phone and a tablet, and/or various computer apparatus, such as a laptop, a desktop, and an all-in-one computer.

Figure 1:
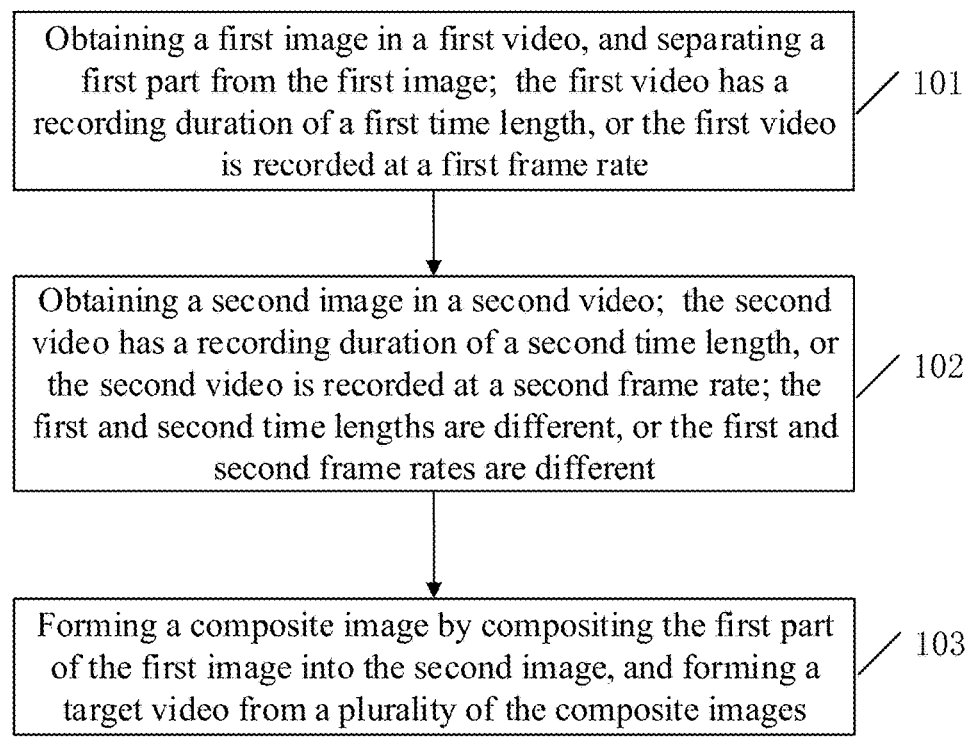
FIG. 1 illustrates a flow chart of an example of a video data processing method consistent with various disclosed embodiments of the present disclosure.

FIG. 1 illustrates a flow chart of an example of a video data processing method consistent with various disclosed embodiments of the present disclosure.

In 101: Obtaining a first image in a first video, and separating a first part from the first image. The first video may have a recording duration of a first time length. Alternatively, the first video may be recorded at a first frame rate. A frame rate may be referred to the number of frames refreshed every second, that is, frames per second (fps).

In some embodiments, the first video may be a video recorded and stored by an electronic apparatus, and having the recording duration of the first time length or recorded at the first frame rate. In other embodiments, the first video may be a video transmitted by another apparatus, which is not limited by the present disclosure.

Because each image frame forming the video has time sequence, in response to storing a data file of the video, each image frame data of the video corresponding to a timestamp may be often stored in time sequence. Therefore, in response to a demand for obtaining a certain image frame in the video, the desired corresponding image may be obtained from the video according to the timestamp. Accordingly, the first image may be obtained from the data file of the first video according to a first timestamp corresponding to the first image.

The first part of the first image may be any part of the first image, such as a main part, a background part or any other part of the first image. In practical applications, the first part of the first image may be separated by an edge detection, a plucking out, or any suitable method.

S102: Obtaining a second image in a second video. The second video may have a recording duration of a second time length. Alternatively, the second video may be recorded at a second frame rate. The first and second time lengths may be different. The first and second frame rates may be different.

In some embodiments, the second video may be a video recorded and stored by an electronic apparatus, and having the recording duration of the second time length or recorded at the second frame rate. In other embodiments, the second video may be a video transmitted by another apparatus. The first and second time lengths may be different, or the first and second frame rates may be different. In other words, the second video may be different from the first video in terms of the recording duration or the frame rate employed in the recording.

Because of the time sequence of each image frame in the video, the second image may be obtained from a data file of the second video according to a second timestamp corresponding to the second image.

In 103: Compositing the first part of the first image and the second image to obtain a composite image. A target video may be formed from a plurality of the composite images. A frame rate of the target video may be different from at least one of the first frame rate and the second frame rate.

After obtaining the first part of the first image in the first video and the second image in the second video, the composite image may be formed by compositing the first part of the first image and the second image. In some embodiments, a main part of the first image may be composited into the second image, such that the main part of the first image may be a main part of the composite image, and the second image may be a background part of the composite image.

After compositing each image frame in the first video into each image frame in the second video by the aforementioned disclosed method, respective composite images may be obtained. The target video may be formed from the respective composite images in time sequence. In some embodiments, the frame rate of the target video (the frame rate used in subsequent playing) may be different from at least one of the first frame rate and the second frame rate. In other words, the frame rate of the target video may be the same as one of the first frame rate and the second frame rate. In other embodiments, the frame rate of the target video may be different from both the first frame rate and the second frame rate.

The video data processing method in some embodiments may include compositing the first part of the first image in the first video into the second image in the second video to obtain the composite image. The target video may be formed from the respective composite images. The recording durations of the first video and the second video may be different, and/or the recording frame rates of the first video and the second video may be different. In some embodiments, the target video may be obtained by compositing two videos with different recording durations or different recording frame rates. Because the first video and the second video have different recording durations or different recording frame rates, after obtaining the target video by compositing the two videos, the two composited parts in the corresponding target video may be played at a same duration or a same frame rate. Therefore, the two composited parts in the corresponding target video may present the effect of inconsistent status-changing rate.

Figure 2:
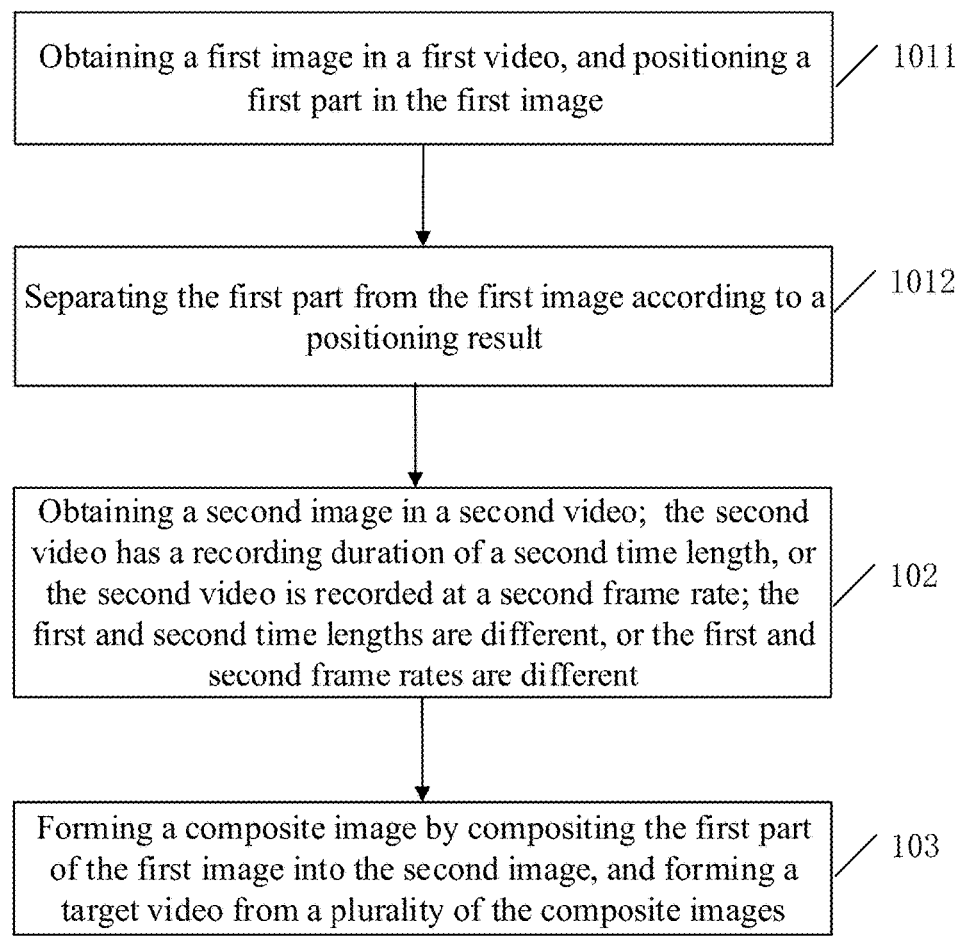
FIG. 2 illustrates a flow chart of another example of a video data processing method consistent with various disclosed embodiments of the present disclosure.

FIG. 2 illustrates a flow chart of another video data processing method consistent with various disclosed embodiments of the present disclosure. Referring to FIG. 2, separating the first part from the first image in 101 may be realized through the following.

In 1011: Positioning the first part in the first image. The first part of the first image may be the main part, the background part or any other part of the first image. According to actual video images compositing requirements, the first part meeting the requirements may be positioned in the first image. In some embodiments, the main part, the background part or any other part of the first image may be positioned.

In 1012: Separating the first part from the first image according to a positioning result. After positioning the desired first part in the first image, based on a corresponding detection method, such as a corresponding image edge detection algorithm, image edge corresponding to the first part may be further precisely positioned from the first image. Then, according to the edge detection result, the first part may be separated from the first image using an image extraction, a plucking out, or any suitable method. In some embodiments, the main part, the background part or any other part of the first image may be separated.

In some embodiments, the first part of the first image may be positioned and separated according to actual requirements, providing support for subsequent video images compositing process.

Figure 3:
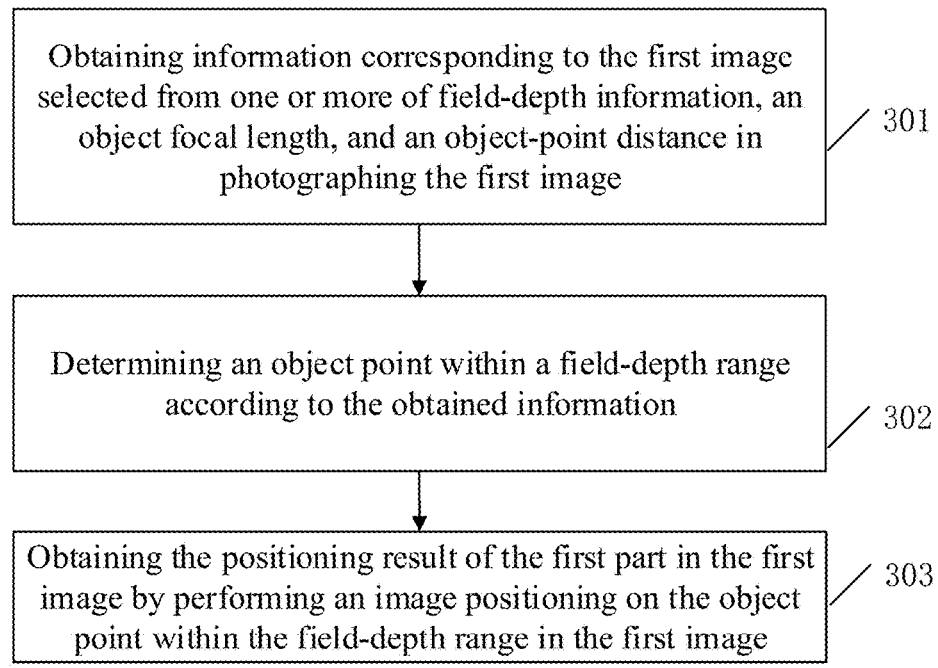
FIG. 3 illustrates a flow chart of positioning a first part in a first image in another example of a video data processing method consistent with various disclosed embodiments of the present disclosure.

Referring to FIG. 3, positioning the first part in the first image in 1011 may be realized through the following.

In 301: Obtaining information corresponding to the first image selected from one or more of field-depth information, an object focal length, and an object-point distance in photographing the first image.

For the demand of the inconsistent status-changing rate between the two different parts in the video image, in practical applications, the obtained video may often desire to have the effect of inconsistent status-changing rate between the foreground main part and the background part. Therefore, a special effect of the foreground main part/the background part having high-rate/low-rate status-changing may be presenting. In some embodiments, a special effect of character travelling through time, or a special effect of character's fast motion/slow motion may be presenting. For the practical applications for illustrative purposes where the first part may be the main part of the image, some embodiments may provide a feasible realization solution of positioning the first part in the first image.

For the main part of the image, such as people/an animal, a building, and a car, etc., in the foreground of the image, during photographing the video, a to-be-photographed object as the main part may often be at the focal point of the lens by focusing. Alternatively, the to-be-photographed object may be at least within a field-depth range of the lens. Therefore, the main part corresponding to the to-be-photographed object may be sharply imaged as much as possible. Accordingly, the main part may be positioned from the image based on the related optical imaging information of the image, such as the field-depth information, the object focal length, and the object-point distance object in photographing the image.

For positioning the first part in the first image, for example, for positioning the main part in the first image, some embodiments may obtain information corresponding to the first image selected from one or more of the field-depth information, the object focal length, and the object-point distance in photographing the first image, providing support for positioning the first part of the first image.

Figure 4:
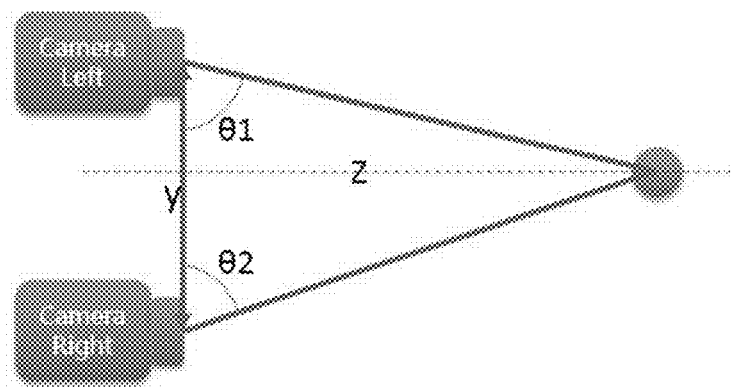
FIG. 4 illustrates a schematic diagram of a dual-cameras ranging principle of an object-point distance in another example of a video data processing method consistent with various disclosed embodiments of the present disclosure.

In practical applications, the object-point distance in the image may be, for example, obtained based on a dual-cameras ranging principle. In some embodiments, two cameras may be provided in an electronic apparatus, which may be understood as simulating human's eyes. A corresponding angle sensor may be provided in the electronic apparatus to detect an angle between the object and the two cameras. Referring to FIG. 4, angles, $\theta 1$ and $\theta 2$, between the object and the two cameras may be detected by an angle sensor, the object-point distance 'Z' may be calculated according to a distance 'y' between the two cameras and the two angles $\theta 1$ and $\theta 2$.

In 302: Determining the object point within the field-depth range based on one or more of the field-depth information, the object focal length, and the object-point distance.

After obtaining the imaging information corresponding to the first image selected from one or more of the field-depth information, the object focal length, and the object-point distance, accordingly, the object point within field-depth range corresponding to the first image may be determined.

According to photographing characteristics of an image (e.g., a video image), in the photographing process, the to-be-photographed object as the main part may often be at the focal point of the lens, or may be at least within the field-depth range of the lens. Thus, the object point within the field-depth range may often include the object point corresponding to the main part of the image. Accordingly, some embodiments may obtain the object point within the field-depth range corresponding to the first image, providing support for determining the main part of the first image.

In 303: Obtaining the positioning result of the first part in the first image by performing an image positioning on the object point within the field-depth range in the first image.

After determining the object point within the field-depth range corresponding to the first image, a region corresponding to the object point within the field-depth range in the first image may be preliminarily determined as a candidate region where the main part of the first image is located. Accordingly, the main part of the first image may be positioned from the candidate region using a main body model matching (e.g., a character model, a building model, etc.), a feature point detection, an edge detection, or any suitable method.

The first part (e.g., the main part) of the first image may be positioned precisely and effectively by the disclosed method of positioning a corresponding part of the image according to the related optical imaging information of the image, providing the desired image data support for a subsequent video images compositing process.

Figure 5:
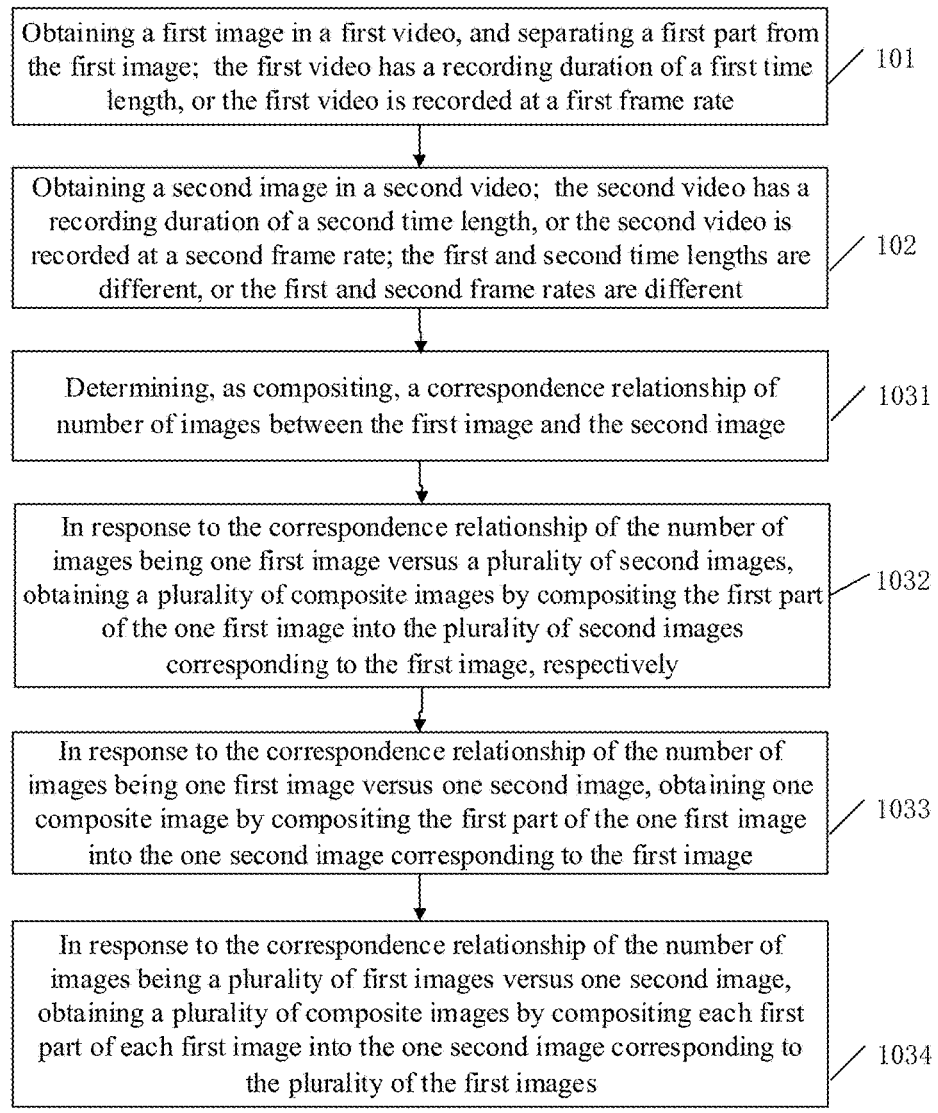
FIG. 5 illustrates a flow chart of another example of a video data processing method consistent with various disclosed embodiments of the present disclosure.

FIG. 5 illustrates a flow chart of another video data processing method consistent with various disclosed embodiments of the present disclosure. Referring to FIG. 5, compositing the first part of the first image and the second image to obtain the composite image in 103 may be realized through the following.

In 1031: Determining a correspondence relationship of number of images between the first image and the second image in response to compositing the images. The correspondence relationship of the number of images may be one first image versus a plurality of second images, one first image versus one second image, and a plurality of first images versus one second image.

In response to compositing the images, according to the actual recording durations of the first video and the second video, and/or the frame rates corresponding to the first video and the second video, and in combination with requirements of the difference in the status-changing rates of the composited two parts in the subsequent composite image, the correspondence relationship of the number of images between the first image and the second image may be determined.

In some embodiments, the main part of the image in the first video may be the main part of the image in the subsequent composite video, and the image in the second video may be the background part of the image in the composite video. The subsequent composite video may desire to present a fast changing effect of the background part of the image (with respect to the main part), as an example.

In some embodiments, the first video and the second video may have different recording durations and the same frame rate during recording. For example, the recording durations of the first video and the second video may be about 1 min (minute) and about 8 min, respectively, and the frame rates of both the first video and the second video may be about 30 fps. Accordingly, to enable the images in the subsequent composite video to be capable of presenting the fast changing effect of the background part, about 30 image frames of the first video may correspond to about 240 image frames of the second video in time sequence, respectively. Thus, each image frame of the first video may correspond to about 8 image frames of the second video in time sequence, respectively. Therefore, the fast changing effect of the background part of the image in the composite video may be realized by compressing a playing duration of the composite video to a shorter duration, e.g., 1 min.

In other embodiments, the first video and the second video may have a same recording duration while different frame rates during recording. For example, the recording durations of both the first video and the second video may be about 8 min, and the frame rates of the first video and the second video may be about 240 fps and about 30 fps, respectively. Accordingly, to enable the images in the subsequent composite video to be capable of presenting the fast changing effect of the background part, the images of part of video segments selected from the first video (e.g., about 240 image frames in an initial about 1 min, or the image frames corresponding to any part of the time periods in the 8 min), may correspond to about 240 image frames of the second video in time sequence, respectively. Taking about 240 image frames in the initial 1 min of the first video as an example, each image frame in about 240 image frames of the first video may one-to-one correspond to a corresponding image frame of the second video in time sequence. Therefore, the fast changing effect of the background part of the image in the composite video may be realized by compressing a playing duration of the composite video to a shorter duration, e.g., 1 min.

In other embodiments, the first video and the second video may have different recording durations and different frame rates during recording. For example, the recording durations of the first video and the second video may be about 1 min and about 8 min, respectively, and the frame rates of the first video and the second video may be about 240 fps and about 30 fps, respectively. Accordingly, to enable the images in the subsequent composite video to be capable of presenting the fast changing effect of the background part, about 240 image frames of the first video may one-to-one correspond to about 240 image frames of the second video in time sequence, respectively. Therefore, the fast changing effect of the background part of the image in the composite video may be realized by compressing a playing duration of the composite video to a shorter duration, e.g., 1 min.

In the aforementioned disclosed embodiments, the correspondence relationship of the number of images is one first image versus a plurality of second images, or one first image versus a plurality of second images for illustrative purpose. In certain embodiments, the main part may desire to present fast status-changing rate, e.g., a special effect of a character's fast-motion. Accordingly, based on the actual recording durations of the first video and the second video, and/or the frame rates corresponding to the first video and the second video, the fast changing effect of the main part of the image in the composite video may be realized by compositing a plurality of first images into one second image. The process of determining the correspondence relationship of the number of images between the first image and the second image may be referred to the corresponding descriptions in the aforementioned disclosed embodiments, and is not repeated herein.

In 1032: In response to the correspondence relationship of the number of images being one first image versus a plurality of second images, obtaining a plurality of composite images by compositing the first part of the one first image and the plurality of second images corresponding to the first image, respectively.

In some embodiments, the recording durations of the first video and the second video may be about 1 min and about 8 min, respectively, and the frame rates of both the first video and the second video may be about 30 fps. Accordingly, each frame first image in the first video may correspond to about 8 frame second images in the second video in time sequence. Thus, in response to compositing the images, the first part (e.g., the main part) separated from each frame first image may be composited into corresponding about 8 frame second images in the second video in time sequence to ultimately obtain the composite video (the target video) comprising about 240 frame composite images. Therefore, the fast changing effect of the background part of the image in the composite video may be realized by compressing a playing duration of the composite video to a shorter duration, e.g., 1 min.

In some embodiments, in response to playing the composite video, a status of the main part in the image may change once (every about 8 image frames may have a same main part) every playing about 8 image frames, while a status of the background part may change once every playing one image frame. Therefore, with respect to the main part, the background part may present the fast changing effect.

In 1033: In response to the correspondence relationship of the number of images being one first image versus one second image, obtaining one composite image by compositing the first part of the one first image and the one second image corresponding to the first image.

In some embodiments, the recording durations of the first video and the second video may be about 1 min and about 8 min, respectively, and the frame rates of the first video and the second video may be about 240 fps and about 30 fps, respectively. Accordingly, each frame first image in the first video may correspond to each frame second image in the second video in time sequence. Thus, in response to compositing the images, the first part (e.g., the main part) separated from each frame first image may be composited to corresponding one frame second image in the second video in time sequence to ultimately obtain the composite video comprising about 240 frame composite images. Therefore, the fast changing effect of the background part of the image in the composite video may be realized by compressing a playing duration of the composite video to a shorter duration, e.g., 1 min.

In some embodiments, in response to playing the composite video, during playing about 1 min composite video, about 8 min background part video in the original second video may be played, while about 1 min main part video in the first video may be played. Therefore, with respect to the main part, the background part may present the fast changing effect.

In 1034: In response to the correspondence relationship of the number of images being a plurality of first images versus one second image, obtaining a plurality of composite images by compositing each first part of each first image and the one second image corresponding to the plurality of the first images.

Similar to the case where the correspondence relationship of the number of images is one first image versus a plurality of second images, in response to the correspondence relationship of the number of images being a plurality of first images versus one second image, each first part of each first image may be composited into the one second image corresponding to the plurality of first images in time sequence. For example, the main part of 8 frame first images may be one-to-one composited to the same one frame second image as the background part in time sequence, respectively. In response to subsequently playing the obtained composite video in a compressed duration, a status of the background part in the image may change once every playing 8 image frames, while a status of the main part may change once every playing one image frame. Therefore, with respect to the background part, the main part may present the fast changing effect, e.g., a special effect of a character's fast-motion.

Based on the disclosed images compositing process, in response to subsequently playing the composite video, the two composited parts in the composite video may present the effect of inconsistent status-changing rate. Therefore, the demand on certain special effects of the video (e.g., a special effect of character travelling through time, or a special effect of character's fast motion/slow motion, etc.) may be effectively met.

Figure 6:
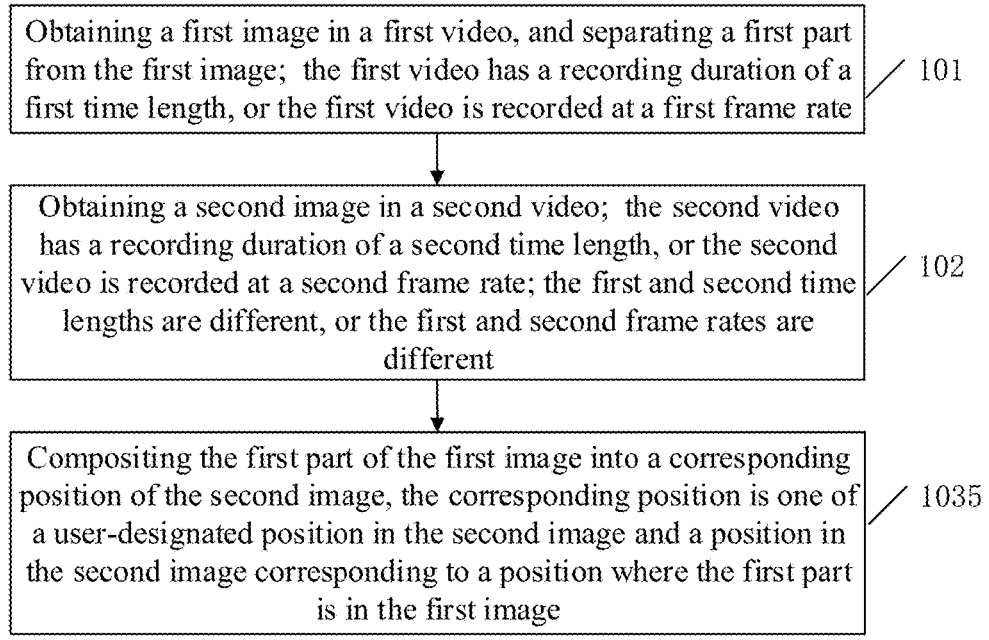
FIG. 6 illustrates a flow chart of another example of a video data processing method consistent with various disclosed embodiments of the present disclosure.

FIG. 6 illustrates a flow chart of another video data processing method consistent with various disclosed embodiments of the present disclosure. Referring to FIG. 6, compositing the first part of the first image and the second image to obtain the composite image in 103 may be realized through the following.

In 1035: Compositing the first part of the first image and a corresponding position of the second image. In some embodiments, the corresponding position may be a user-designated position in the second image. In other embodiments, the corresponding position may be a position in the second image corresponding to a position where the first part is in the first image.

In some embodiments, in response to compositing the first part of the first image and the second image, e.g., in response to compositing the main part of the first image and the second image as the background part, the first part of the first image may be composited into the user-designated position in the second image. The user-designated position may include a central region, an edge region, a foreground region, or a background region, etc.

In addition, the first part of the first image may be directly composited into the position in the second image corresponding to the position where the first part is in the first image. For example, in response to the first part being located at a certain position in a left edge region of the first image, the first part may be composited into a corresponding position in a left edge region of the second image according to the position information (e.g., position coordinates) of the first part in the first image.

In some embodiments, the first part of the first image may be composited into the second image using at least one of the methods described in 1035 according to actual needs, which is not limited by the present disclosure.

In some embodiments, the first part of the first image may be composited into the position in the second image corresponding to the position where the first part is in the first image, or the first part of the first image may be composited into any user-designated position in the second image. Therefore, diverse video images compositing demand may be met.

The first video and the second video may be at least part of video in a same video. Accordingly, the first image of the first video and the second image in the second video may be images in the same video.

In response to the first video and the second video being at least part of video in the same video, to enable different parts of the image to be capable of presenting different status-changing rates, for example, to enable the background part in the video to present a faster/slower status-changing effect compared to the main part (e.g., a special effect of character travelling through time, or a special effect of character's fast motion), according to the demand on different status-changing rates of different parts, the part of the video configured to be the first video and the part of the video configured to be the second video may be determined in the same video. According to the disclosed images compositing process, the images in the first video and the second video may be composited to ultimately obtain the composite video (that is, the target video) meeting the requirements.

In some embodiments, the background part of an image in the ultimate composite video desires a fast status-changing rate as an example. According to actual needs, part of video in a corresponding time segment may be cut from the same video as the first video. For example, a recording duration of the same video may be about 60 min. The video in an initial about 5 min or the video in any continuous about 5 min segment may be cut from the same video as the first video. The entire about 60-min video may be configured as the second video. Accordingly, the main part of each image frame in the first video may be composited into corresponding about 12 image frames in the second video in time sequence to obtain a composite video. The ultimately obtained composite video may be compressed to have a short playing duration, e.g., 5-min playing duration. Therefore, in response to playing the composite video, the playing of one frame of the main part image may correspond to the playing of about 12 frames of the background part image. Thus, with respect to the main part, the background part of the composite video may present fast status-changing effect.

In some embodiments, by processing the recorded same video, different parts in the processed video may present different status-changing rates during playing. Therefore, the demand on certain special effects of the video (e.g., a special effect of character travelling through time, or a special effect of character's fast motion/slow motion, etc.) may be effectively met.

The present disclosure also provides an electronic apparatus. The electronic apparatus may be a terminal device, such as a smart phone and a tablet, and/or various computer apparatus, such as a laptop, a desktop, and an all-in-one computer.

In some embodiments, the electronic apparatus may include a memory and a processor coupled with the memory. The memory stores computer-readable instructions for the processor to execute the disclosed methods.

Figure 7:
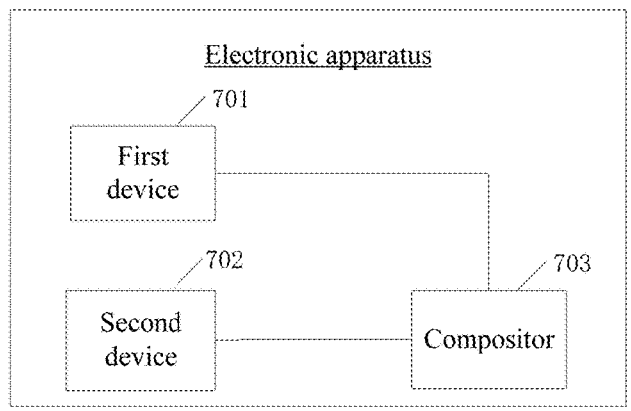
FIG. 7 illustrates a structural diagram of an example of an electronic apparatus consistent with various disclosed embodiments of the present disclosure.

FIG. 7 illustrates a structural diagram of an example of an electronic apparatus consistent with various disclosed embodiments of the present disclosure. Referring to FIG. 7, the electronic apparatus may include a first device 701, a second device 702, and a compositor 703.

The first device 701 may obtain a first image in a first video and separate a first part from the first image. The first video may have a recording duration of a first time length. Alternatively, the first video may be recorded at a first frame rate. A frame rate may be referred to the number of frames refreshed every second, that is, frames per second (fps).

In some embodiments, the first video may be a video recorded and stored by an electronic apparatus, and having the recording duration of the first time length or recorded at the first frame rate. In other embodiments, the first video may be a video transmitted by another apparatus, which is not limited by the present disclosure.

Because each image frame forming the video has time sequence, in response to storing a data file of the video, each image frame data of the video corresponding to a timestamp may be often stored in time sequence. Therefore, in response to a demand for obtaining a certain image frame in the video, the desired corresponding image may be obtained from the video according to the timestamp. Accordingly, the first device 701 may obtain the first image from the data file of the first video according to a first timestamp corresponding to the first image.

The first part of the first image may be any part of the first image, such as a main part, a background part or any other part of the first image. In practical applications, the first part of the first image may be separated by an edge detection, a plucking out, or any suitable method.

The second device 702 may obtain a second image in a second video. The second video may have a recording duration of a second time length. Alternatively, the second video may be recorded at a second frame rate. The first and second time lengths may be different. The first and second frame rates may be different.

In some embodiments, the second video may be a video recorded and stored by an electronic apparatus, and having the recording duration of the second time length or recorded at the second frame rate. In other embodiments, the second video may be a video transmitted by another apparatus. The first and second time lengths may be different, or the first and second frame rates may be different. In other words, the second video may be different from the first video in terms of the recording duration or the frame rate employed in the recording.

Because of the time sequence of each image frame in the video, the second device 702 may obtain the second image from a data file of the second video according to a second timestamp corresponding to the second image.

The compositor 703 may composite the first part of the first image and the second image to obtain a composite image. A target video may be formed from respective composite images.

After obtaining the first part of the first image in the first video and the second image in the second video, the first part of the first image may be composited into the second image to obtain the composite image. In some embodiments, a main part of the first image may be composited into the second image, such that the main part of the first image may be a main part of the composite image, and the second image may be a background part of the composite image.

After compositing each image frame in the first video into each image frame in the second video by the aforementioned disclosed method, respective composite images may be obtained. The target video may be formed from the respective composite images in time sequence. In some embodiments, the frame rate of the target video (the frame rate used in subsequent playing) may be different from at least one of the first frame rate and the second frame rate. In other words, the frame rate of the target video may be the same as one of the first frame rate and the second frame rate. In other embodiments, the frame rate of the target video may be different from both the first frame rate and the second frame rate.

The electronic apparatus in some embodiments may composite the first part of the first image in the first video into the second image in the second video to obtain the composite image. The target video may be formed from the respective composite images. The recording durations of the first video and the second video may be different. Alternatively, the recording frame rates of the first video and the second video may be different. In some embodiments, the target video may be obtained by compositing two videos with different recording durations or different recording frame rates. Because the first video and the second video have different recording durations or different recording frame rates, after obtaining the target video by compositing the two videos, the two composited parts in the corresponding target video may be played at a same duration or a same frame rate. Therefore, the two composited parts in the corresponding target video may present the effect of inconsistent status-changing rate.

The first device 701 may separate the first part from the first image through the following. The first device 701 may position the first part in the first image, and separate the first part from the first image according to a positioning result. The first part of the first image may be the main part, the background part or any other part of the first image. According to the actual video images compositing requirements, the first part meeting the requirements may be positioned in the first image. In some embodiments, the main part, the background part or any other part of the first image may be positioned.

After positioning the desired first part in the first image, based on a corresponding detection method, such as a corresponding image edge detection algorithm, image edge corresponding to the first part may be further precisely positioned from the first image. Then, according to the edge detection result, the first part may be separated from the first image using an image extraction, a plucking out, or any suitable method. In some embodiments, the main part, the background part or any other part of the first image may be separated.

In some embodiments, the first part of the first image may be positioned and separated according to actual requirements, providing support for subsequent video images compositing process.

The first device 701 may position the first part in the first image through the following. The first device may obtain information corresponding to the first image selected from one or more of field-depth information, an object focal length, and an object-point distance in photographing the first image. The first device may also determine the object point within the field-depth range based on one or more of the field-depth information, the object focal length, and the object-point distance. Further, the first device may obtain the positioning result of the first part in the first image by performing an image positioning on the object point within the field-depth range in the first image.

For the demand of the inconsistent status-changing rate between the two different parts in the video image, in practical applications, the obtained video may often desire to have the effect of inconsistent status-changing rate between the foreground main part and the background part. Therefore, a special effect of the foreground main part/the background part having high-rate/low-rate status-changing may be presenting. In some embodiments, a special effect of character travelling through time, or a special effect of character's fast motion/slow motion may be presenting. For the practical applications for illustrative purposes where the first part may be the main part of the image, some embodiments may provide a feasible realization solution of positioning the first part in the first image.

For the main part of the image, such as people/an animal, a building, and a car, etc., in the foreground of the image, during photographing the video, a to-be-photographed object as the main part may often be at the focal point of the lens by focusing. Alternatively, the to-be-photographed object may be at least within the field-depth range of the lens. Therefore, the main part corresponding to the to-be-photographed object may be sharply imaged as much as possible. Accordingly, the main part may be positioned from the image based on the related optical imaging information of the image selected from one or more of the field-depth information, the object focal length, and the object-point distance in photographing the image.

For positioning the first part in the first image, for example, for positioning the main part in the first image, some embodiments may obtain the information corresponding to the first image selected from one or more of the field-depth information, the object focal length, and the object-point distance in photographing the first image, providing support for positioning the first part of the first image.

In practical applications, the object-point distance in the image may be, for example, obtained based on a dual-cameras ranging principle. In some embodiments, two cameras may be provided in an electronic apparatus in advance, which may be visually understood as simulating human's eyes. A corresponding angle sensor may be provided in the electronic apparatus to detect an angle between the object and the two cameras. Referring to FIG. 4, angles, $\theta 1$ and $\theta 2$, between the object and the two cameras may be detected by the angle sensor, the object-point distance 'Z' may be calculated according to a distance 'y' between the two cameras and the two angles $\theta 1$ and $\theta 2$.

After obtaining the imaging information corresponding to the first image selected from one or more of the field-depth information, the object focal length, and the object-point distance, accordingly, the object point within the field-depth range corresponding to the first image may be determined.

According to photographing characteristics of an image (e.g., a video image), in the photographing process, the to-be-photographed object as the main part may often be at the focal point of the lens, or may be at least within the field-depth range of the lens. Thus, the object point within the field-depth range may often include the object point corresponding to the main part in the image. Accordingly, some embodiments may obtain the object point within the field-depth range corresponding to the first image, providing support for determining the main part of the first image.

After determining the object point within the field-depth range corresponding to the first image, a region corresponding to the object point within the field-depth range in the first image may be preliminarily determined as a candidate region where the main part of the first image is located. Accordingly, the main part of the first image may be positioned from the candidate region using a main body model matching (e.g., a character model, a building model, etc.), a feature point detection, an edge detection, or any suitable method.

The first part (e.g., the main part) of the first image may be positioned precisely and effectively by the disclosed method of positioning a corresponding part of the image according to the related optical imaging information of the image, providing the desired image data support for a subsequent video images compositing process.

The compositor may determine a correspondence relationship of the number of images between the first image and the second image in response to compositing the images. In response to the correspondence relationship of the number of images being one first image versus a plurality of second images, the compositor may obtain a plurality of composite images by compositing the first part of the one first image and the plurality of second images corresponding to the first image, respectively. In addition, in response to the correspondence relationship of the number of images being one first image versus one second image, the compositor may obtain one composite image by compositing the first part of the one first image and the one second image corresponding to the first image. Further, in response to the correspondence relationship of the number of images being a plurality of first images versus one second image, the compositor may obtain a plurality of composite images by compositing each first part of each first image and the one second image corresponding to the plurality of the first images.

The correspondence relationship of the number of images may be one first image versus a plurality of second images, one first image versus one second image, or a plurality of first images versus one second image. In response to compositing the images, according to the actual recording durations of the first video and the second video, and/or the frame rates corresponding to the first video and the second video, and in combination with requirements of the difference in the status-changing rates of the composited two parts in the subsequent composite image, the correspondence relationship of the number of images between the first image and the second image may be determined.

In some embodiments, the main part of the image in the first video may be the main part of the image in the subsequent composite video, and the image in the second video may be the background part of the image in the composite video. The subsequent composite video may desire to present a fast changing effect of the background part of the image (with respect to the main part), as an example.

In some embodiments, the first video and the second video may have different recording durations and the same frame rate during recording. For example, the recording durations of the first video and the second video may be about 1 min and about 8 min, respectively, and the frame rates of both the first video and the second video may be about 30 fps. Accordingly, to enable the images in the subsequent composite video to be capable of presenting the fast changing effect of the background part, about 30 image frames of the first video may correspond to about 240 image frames of the second video in time sequence, respectively. Thus, each image frame of the first video may correspond to about 8 image frames of the second video in time sequence, respectively. Therefore, the fast changing effect of the background part of the image in the composite video may be realized by compressing a playing duration of the composite video to a shorter duration, e.g., 1 min.

In other embodiments, the first video and the second video may have a same recording duration while different frame rates during recording. For example, the recording durations of both the first video and the second video may be about 8 min, and the frame rates of the first video and the second video may be about 240 fps and about 30 fps, respectively. Accordingly, to enable the images in the subsequent composite video to be capable of presenting the fast changing effect of the background part, the images of part of video segments selected from the first video (e.g., about 240 image frames in an initial about 1 min, or the image frames corresponding to any part of the time periods in about 8 min), may correspond to about 240 image frames of the second video in time sequence, respectively. Taking about 240 image frames in the initial 1 min of the first video as an example, each image frame in about 240 image frames of the first video may one-to-one correspond to a corresponding image frame of the second video in time sequence. Therefore, the fast changing effect of the background part of the image in the composite video may be realized by compressing a playing duration of the composite video to a shorter duration, e.g., 1 min.

In other embodiments, the first video and the second video may have different recording durations and different frame rates during recording. For example, the recording durations of the first video and the second video may be about 1 min and about 8 min, respectively, and the frame rates of the first video and the second video may be about 240 fps and about 30 fps, respectively. Accordingly, to enable the images in the subsequent composite video to be capable of presenting the fast changing effect of the background part, about 240 image frames of the first video may one-to-one correspond to about 240 image frames of the second video in time sequence, respectively. Therefore, the fast changing effect of the background part of the image in the composite video may be realized by compressing a playing duration of the composite video to a shorter duration, e.g., 1 min.

In the aforementioned disclosed embodiments, the correspondence relationship of the number of images is one first image versus a plurality of second images, or one first image versus one second image for illustrative purpose. In certain embodiments, the main part may desire to present fast status-changing rate, e.g., a special effect of a character's fast-motion. Accordingly, based on the actual recording durations of the first video and the second video, and/or the frame rates corresponding to the first video and the second video, the fast changing effect of the main part of the image in the composite video may be realized by compositing a plurality of first images into one second image. The process of determining the correspondence relationship of the number of images between the first image and the second image may be referred to the corresponding descriptions in the aforementioned disclosed embodiments, and is not repeated herein.

In some embodiments, the recording durations of the first video and the second video may be about 1 min and about 8 min, respectively, and the frame rates of both the first video and the second video may be about 30 fps. Accordingly, each frame first image in the first video may correspond to about 8 frame second images in the second video in time sequence. Thus, in response to compositing the images, the first part (e.g., the main part) separated from each frame first image may be composited into corresponding about 8 frame second images in the second video in time sequence to ultimately obtain the composite video (the target video) comprising about 240 frame composite images. Therefore, the fast changing effect of the background part of the image in the composite video may be realized by compressing a playing duration of the composite video to a shorter duration, e.g., 1 min.

In some embodiments, in response to playing the composite video, a status of the main part in the image may change once (every about 8 image frames may have a same main part) every playing about 8 image frames, while a status of the background part may change once every playing one image frame. Therefore, with respect to the main part, the background part may present the fast changing effect.

In some embodiments, the recording durations of the first video and the second video may be about 1 min and about 8 min, respectively, and the frame rates of the first video and the second video may be about 240 fps and about 30 fps, respectively. Accordingly, each frame first image in the first video may correspond to each frame second image in the second video in time sequence. Thus, in response to compositing the images, the first part (e.g., the main part) separated from each frame first image may be composited to corresponding one frame second image in the second video in time sequence to ultimately obtain the composite video comprising about 240 frame composite images. Therefore, the fast changing effect of the background part of the image in the composite video may be realized by compressing a playing duration of the composite video to a shorter duration, e.g., 1 min.

In some embodiments, in response to playing the composite video, during playing about 1 min composite video, about 8 min background part video in the original second video may be played, while about 1 min main part video in the first video may be played. Therefore, with respect to the main part, the background part may present the fast changing effect.

Similar to the case where the correspondence relationship of the number of images is one first image versus a plurality of second images, in response to the correspondence relationship of the number of images being a plurality of first images versus one second image, each first part of each first image may be composited into the one second image corresponding to the plurality of first images in time sequence. For example, the main part of about 8 frame first images may be one-to-one composited to the same one frame second image as the background part in time sequence, respectively. In response to subsequently playing the obtained composite video in a compressed duration, a status of the background part in the image may change once every playing about 8 image frames, while a status of the main part may change once every playing one image frame. Therefore, with respect to the background part, the main part may present the fast changing effect, e.g., a special effect of a character's fast-motion.

Based on the disclosed images compositing process, in response to subsequently playing the composite video, the two composited parts in the composite video may present the effect of inconsistent status-changing rate. Therefore, the demand on certain special effects of the video (e.g., a special effect of character travelling through time, or a special effect of character's fast motion/slow motion, etc.) may be effectively met.

The compositor may composite the first part of the first image and a corresponding position of the second image. In some embodiments, the corresponding position may be a user-designated position in the second image. In other embodiments, the corresponding position may be a position in the second image corresponding to a position where the first part is in the first image.

In some embodiments, in response to compositing the first part of the first image and the second image, e.g., in response to compositing the main part of the first image and the second image as the background part, the first part of the first image may be composited into the user-designated position in the second image. The user-designated position may include a central region, an edge region, a foreground region, or a background region, etc.

In addition, the first part of the first image may be directly composited into the position in the second image corresponding to the position where the first part is in the first image. For example, in response to the first part being located at a certain position in a left edge region of the first image, the first part may be composited into a corresponding position in a left edge region of the second image according to the position information (e.g., position coordinates) of the first part in the first image.

In some embodiments, the first part of the first image may be composited into the second image using at least one of the aforementioned disclosed methods according to actual needs, which is not limited by the present disclosure.

In some embodiments, the first part of the first image may be composited into the position in the second image corresponding to the position where the first part is in the first image, or the first part of the first image may be composited into any user-designated position in the second image. Therefore, diverse video images compositing demand may be met.

In the disclosed video data processing method and electronic apparatus, the first part of the first image in the first video and the second image in the second video may be composited to obtain the composite image. The target video may be formed from respective composite images. The recording duration of the first video may be different from the recording duration of the second video, and/or the recording frame rate of the first video may be different from the recording frame rate of the second video. In some embodiments, the target video may be obtained by compositing two videos with different recording durations or different recording frame rates. Because the first video and the second video have different recording durations or different recording frame rates, after obtaining the target video by repeatedly compositing the two videos, the two composited parts in the corresponding target video may be played at a same duration or a same frame rate. Therefore, the two composited parts in the corresponding target video may present the effect of inconsistent status-changing rate.

Various embodiments in the present specification are described in a progressive manner. Each embodiment mainly describes in terms of differences from other embodiments, and the same or similar parts between the various embodiments may be referred to each other.

The device and method described in the above embodiments may be realized through other approaches. That is, the description on the methods and devices in the above embodiments may only be schematic examples. For instance, the components or units may be merely defined based on their logical functions, and in actual applications, the components or units may be defined based on other criteria.

For example, multiple units or components may be composited together or be integrated into another system, or some features may be ignored or may not be executed. Moreover, the coupling between the units and components illustrated or discussed above may be direct coupling or communication connections through some indirect coupling or communication connections between interfaces, devices, or units. The coupling may be electrical, mechanical, or in any other appropriate form.

The components or units described separately above, may or may not be physically separated. Each component illustrated and discussed above as a unit may or may not be a physical unit. That is, the component may be located at a certain position, or may be distributed to multiple network units. Moreover, based on the needs of actual applications, all or a part of the units may be used to realize the methods consistent with disclosed embodiments.

Further, various functional units discussed in some embodiments may be integrated in a single processing unit or may be physically independent from each other. In addition, a plurality of units formed by integrating two or more than two functional units together may further form a processing unit. The integrated units described above may be realized through hardware or through software functional units.

When the integrated units are realized through software functional units, and are sold and used as independent products, the integrated units may be stored on computer readable storage media. Based on this understanding, all or a part of the generic principles or the scope of the invention may be embodied in software products. The computer software products may be stored in storage media and may include a plurality of commands to instruct a computer system (such as personal computer, server, network system, etc.) or a processor to execute all or a part of the procedures described in various embodiments consistent with the present disclosure. The storage media may include U disk, mobile hard disk, read-only memory (ROM), random access memory (RAM), magnetic disk, optical disk, or any other appropriate media that can be used to store program code.

The description of some embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   obtaining a first image in a first video and separating a first part from the first image, wherein a recording duration of the first video is a first time length;
   obtaining a second image in a second video, wherein a recording duration of the second video is a second time length, and the first and second time lengths are different;
   forming a composite image by compositing the first part of the first image and the second image; and
   forming a target video from a plurality of composite images, the plurality of composite images including the composite image.

2. The method according to claim 1, wherein separating the first part from the first image includes:
   positioning the first part in the first image, and
   separating the first part from the first image according to a positioning result.

3. The method according to claim 2, wherein positioning the first part in the first image includes:
   obtaining information corresponding to the first image selected from one or more of field-depth information, an object focal length, and an object-point distance in photographing the first image,
   determining an object point within a field-depth range according to the obtained information, and
   obtaining the positioning result of the first part in the first image by performing an image positioning on the object point within the field-depth range in the first image.

4. The method according to claim 1, wherein compositing the first part of the first image and the second image includes:
- determining, as compositing, a correspondence relationship of number of images between the first image and the second image,
- in response to the correspondence relationship of the number of images being one first image versus a plurality of second images, obtaining the plurality of composite images by compositing the first part of the one first image and the plurality of second images corresponding to the first image, respectively,
- in response to the correspondence relationship of the number of images being one first image versus one second image, obtaining one composite image by compositing the first part of the one first image and the one second image corresponding to the first image, and
- in response to the correspondence relationship of the number of images being a plurality of first images versus one second image, obtaining the plurality of composite images by compositing each first part of each first image and the one second image corresponding to the plurality of the first images.

5. The method according to claim 1, wherein compositing the first part of the first image and the second image includes:
- compositing the first part of the first image and a corresponding position of the second image,
  - wherein the corresponding position is one of a user-designated position in the second image and a position in the second image corresponding to a position where the first part is in the first image.

6. The method according to claim 1, wherein:
a playing time length of the target video is different from at least one of the first time length and the second time length.

7. The method according to claim 1, wherein:
the first part is separated from the first image by one of an edge detection, a plucking out, and an image extraction.

8. The method according to claim 1, wherein:
the first video and the second video are at least part of a same video, and
the first image in the first video and the second image in the second video are images in the same video.

9. A method, comprising:
- obtaining a first image in a first video and separating a first part from the first image, wherein the first video is recorded at a first frame rate;
- obtaining a second image in a second video, wherein the second video is recorded at a second frame rate, and the first and second frame rates are different;
- forming a composite image by compositing the first part of the first image and the second image; and
- forming a target video from a plurality of composite images, the plurality of composite images including the composite image.

10. The method according to claim 9, wherein:
a frame rate of the target video is different from at least one of the first frame rate and the second frame rate.

11. An electronic apparatus, comprising:
- a first device, wherein the first device obtains a first image in a first video and separates a first part from the first image, and wherein the first video has a recording duration of a first time length or the first video is recorded at a first frame rate;
- a second device, wherein the second device obtains a second image in a second video, wherein the second video has a recording duration of a second time length or the second video is recorded at a second frame rate, and wherein the first and second time lengths are different, or the first and second frame rates are different; and
- a compositor, wherein the compositor forms a composite image by compositing the first part of the first image and the second image, and forms a target video from a plurality of composite images, the plurality of composite images including the composite image.

12. The apparatus according to claim 11, wherein the first device:
- positions the first part in the first image, and
- separates the first part from the first image according to a positioning result.

13. The apparatus according to claim 12, wherein the first device further:
- obtains information corresponding to the first image selected from one or more of field-depth information, an object focal length, and an object-point distance in photographing the first image,
- determines an object point within a field-depth range according to the obtained information, and
- obtains the positioning result of the first part in the first image by performing an image positioning on the object point within the field-depth range in the first image.

14. The apparatus according to claim 11, wherein the compositor:
- determines, as compositing, a correspondence relationship of number of images between the first image and the second image,
- in response to the correspondence relationship of the number of images being one first image versus a plurality of second images, obtains the plurality of composite images by compositing the first part of the one first image and the plurality of second images corresponding to the first image, respectively,
- in response to the correspondence relationship of the number of images being one first image versus one second image, obtains one composite image by compositing the first part of the one first image and the one second image corresponding to the first image, and
- in response to the correspondence relationship of the number of images being a plurality of first images versus one second image, obtains the plurality of composite images by compositing each first part of each first image and the one second image corresponding to the plurality of the first images.

15. The apparatus according to claim 11, wherein the compositor:
- composites the first part of the first image and a corresponding position of the second image,
  - wherein the corresponding position is one of a user-designated position in the second image and a position in the second image corresponding to a position where the first part is in the first image.

16. The apparatus according to claim 11, wherein:
a frame rate of the target video is different from at least one of the first frame rate and the second frame rate.

17. The apparatus according to claim 11, wherein:
a playing duration of the target video is different from at least one of the first time length and the second time length.

18. The apparatus according to claim 11, wherein:
the first part is separated from the first image by one of an edge detection, a plucking out, and an image extraction.

19. The apparatus according to claim 11, wherein:
the first video and the second video are at least part of a same video, and
the first image in the first video and the second image in the second video are images in the same video.

20. The apparatus according to claim 13, further including:
two cameras, wherein the two cameras obtain the object-point distance according to a dual-cameras ranging principle.

* * * * *